(12) United States Patent
Czapla et al.

(10) Patent No.: US 12,078,428 B2
(45) Date of Patent: Sep. 3, 2024

(54) HEAT EXCHANGER LIMITING THE RISK OF CONTAMINATION BETWEEN TWO FLUIDS AND AIRCRAFT COMPRISING AT LEAST ONE SUCH HEAT EXCHANGER

(71) Applicants: Airbus SAS, Blagnac (FR); Airbus Operations SAS, Toulouse (FR)

(72) Inventors: Lionel Czapla, Toulouse (FR); Jorge A. Carretero Benignos, Taufkirchen (DE)

(73) Assignees: AIRBUS SAS, Blagnac (FR); AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/879,869

(22) Filed: Aug. 3, 2022

(65) Prior Publication Data
US 2023/0044493 A1 Feb. 9, 2023

(30) Foreign Application Priority Data
Aug. 5, 2021 (FR) ...................... 2108513

(51) Int. Cl.
*F28D 9/00* (2006.01)
*B64D 37/32* (2006.01)
(Continued)

(52) U.S. Cl.
CPC ........... *F28D 9/0006* (2013.01); *B64D 37/32* (2013.01); *B64D 37/34* (2013.01); *F02C 7/224* (2013.01);
(Continued)

(58) Field of Classification Search
CPC ........ B64D 37/30; B64D 37/32; B64D 37/34; F02C 7/224; F28D 9/0006; F28D 9/0037; F28D 2021/0021; F28D 2021/0087; F28F 3/005; F28F 9/001; F28F 9/02; F28F 9/0246; F28F 2265/16
See application file for complete search history.

(56) References Cited

U.S. PATENT DOCUMENTS 4,607,684 A * 8/1986 Wiard .................. F28F 9/0217
165/70
5,333,681 A * 8/1994 Jullien ................. F28F 9/0075
165/145
(Continued)

FOREIGN PATENT DOCUMENTS

KR 20200068899 A * 6/2020
WO WO-9703281 A1 * 1/1997 .............. F02C 7/185

OTHER PUBLICATIONS

French Search Report; priority document.

*Primary Examiner* — Eric S Ruppert
*Assistant Examiner* — Hans R Weiland
(74) *Attorney, Agent, or Firm* — Greer, Burns & Crain, Ltd.

(57) ABSTRACT

A heat exchanger including a sealed housing and a body positioned inside the housing, the body including a stack of least one first assembly of first and second plates pressed against each other, between which flows a first fluid, and at least one second assembly of third and fourth plates pressed against each other, between which flows a second fluid, the first and second assemblies being arranged so that they transfer heat between the first and second fluids. This configuration limits the risk of leaks and mixing of the two fluids.

12 Claims, 5 Drawing Sheets

(51) Int. Cl.
*B64D 37/34* (2006.01)
*F02C 7/224* (2006.01)
*F28F 3/00* (2006.01)
*F28F 9/00* (2006.01)

(52) U.S. Cl.
CPC ............ F28D 9/0037 (2013.01); F28F 3/005 (2013.01); F28F 9/005 (2013.01); *F28F 2265/16* (2013.01)

(56) References Cited

U.S. PATENT DOCUMENTS

| | | |
|---|---|---|
| 10,329,026 B2 | 6/2019 | Haskins et al. |
| 2006/0016512 A1* | 1/2006 | Takano .................. F17C 5/007 |
| | | 141/82 |
| 2007/0169916 A1 | 7/2007 | Wand et al. |
| 2008/0202724 A1* | 8/2008 | Lorenz ................. F28D 7/0091 |
| | | 403/24 |
| 2012/0267084 A1* | 10/2012 | Crawford ................ F28F 3/005 |
| | | 165/170 |
| 2013/0206359 A1 | 8/2013 | Bertilsson et al. |
| 2014/0174099 A1* | 6/2014 | Oh ........................ H10N 10/80 |
| | | 62/3.2 |
| 2014/0367075 A1* | 12/2014 | Hiwatashi ............... F28D 9/005 |
| | | 165/166 |
| 2016/0320146 A1* | 11/2016 | Hansen ............... F28D 20/0034 |
| 2020/0088102 A1* | 3/2020 | Roberge ................. F02C 7/224 |
| 2020/0408465 A1* | 12/2020 | Yoshimura ............. F28F 3/022 |
| 2021/0333051 A1* | 10/2021 | Kontu .................. F28D 9/0043 |

* cited by examiner

HEAT EXCHANGER LIMITING THE RISK OF CONTAMINATION BETWEEN TWO FLUIDS AND AIRCRAFT COMPRISING AT LEAST ONE SUCH HEAT EXCHANGER

CROSS-REFERENCES TO RELATED APPLICATIONS

This application claims the benefit of the French patent application No. 2108513 filed on Aug. 5, 2021, the entire disclosures of which are incorporated herein by way of reference.

FIELD OF THE INVENTION

The present application relates to a heat exchanger limiting the risk of contamination between two fluids, and an aircraft comprising at least one such heat exchanger.

BACKGROUND OF THE INVENTION

According to one embodiment, an aircraft comprises a plurality of hydrogen-powered propeller engines and at least one hydrogen supply device configured to supply the engines.

The hydrogen supply device comprises a hydrogen tank positioned in the fuselage, a high-pressure pump for pressurizing the hydrogen, a heat exchanger configured to heat the hydrogen, which passes from a liquid state to a gaseous state, and various pipes to connect the hydrogen tank, the pump, the heat exchanger and the engine.

The pipes are double-skinned tubes to prevent any hydrogen leaks.

According to one embodiment, shown in FIG. 1, a heat exchanger 10 comprises a stack of plates 12.1 to 12.3 between which a first fluid 14 flowing in a first circuit and a second fluid 16 flowing in a second circuit alternately flow. Such a heat exchanger 10 comprises two end plates 12.1, 12.3 each having at least one groove on a single face, and intermediate plates 12.2 each having at least one groove on each of their faces, the grooves being arranged on the faces of the various plates 12.1 to 12.3 so that they define channels between the end and intermediate plates 12.1 to 12.3 when they are stacked and pressed against each other.

According to this embodiment, the first and second fluids 14, 16 are separated by a single intermediate plate 12.2.

If a crack appears on one of the intermediate plates 12.2, the first and second fluids 14, 16 can mix.

When the first fluid 14 is hydrogen, the whole second circuit for the second fluid 16 must be designed as if it were intended for hydrogen, and double-skinned tubes must be provided, for example.

This solution is unsatisfactory as it increases the mass, volume and costs of the second circuit for the second fluid, and makes it more complex.

The present invention aims to overcome all or some of the drawbacks of the prior art.

SUMMARY OF THE INVENTION

To this end, the invention relates to a plate heat exchanger transferring heat between first and second fluids, comprising a sealed housing and a body positioned inside the housing, the body including a stack of at least a first assembly of first and second plates pressed against each other, between which the first fluid flows, and at least a second assembly of third and fourth plates pressed against each other, between which the second fluid flows, the first and second assemblies being arranged so that they transfer heat between the first and second fluids.

According to the invention, the first fluid is hydrogen and the housing comprises at least one sensor configured to detect the presence of hydrogen in the housing.

In addition, the two fluids are separated in the heat exchanger by two plates, which makes it possible to reduce the risk of the two fluids mixing. Furthermore, positioning the body of the heat exchanger inside a sealed housing makes it possible to minimize the risk of leaks. As a result, as the first fluid is hydrogen, the circuit for the second fluid does not need to be secured in the same way as the hydrogen circuit.

According to another feature, each first assembly comprises at least a first peripheral rim, around the first and second plates, and at least a first channel configured to channel the first fluid, positioned between the first and second plates and having a first end emerging on the first peripheral rim and a second end emerging on the first peripheral rim. In parallel, each second assembly comprises at least a second peripheral rim, around the third and fourth plates, and at least a second channel configured to channel the second fluid, positioned between the third and fourth plates and having a first end emerging on the second peripheral rim and a second end emerging on the second peripheral rim.

According to another feature, the body comprises a stack of a plurality of first assemblies and a plurality of second assemblies, the first and second assemblies being alternated, the stack including first and second faces on which the first and second ends of the first and second channels are distributed.

According to another feature, the first ends of the first channels of the first assemblies are positioned on a first half of the first face and the second ends of the second channels of the second assemblies are positioned on a second half of the first face. In parallel, the second ends of the first channels of the first assemblies are positioned on a first half of the second face and the first ends of the second channels of the second assemblies are positioned on a second half of the second face.

According to another feature, the body comprises:
a first leader having a first pipe and configured to connect the first pipe to the first ends of the first channels of the first assemblies,
a first manifold having a second pipe and configured to connect the second pipe to the second ends of the first channels of the first assemblies,
a second leader having a third pipe and configured to connect the third pipe to the first ends of the second channels of the second assemblies,
a second manifold having a fourth pipe and configured to connect the fourth pipe to the second ends of the second channels of the second assemblies.

According to another feature, the heat exchanger comprises at least one double-skinned pipe including inner and outer pipes, and at least one connection system connecting the inner pipe of the double-skinned pipe and one of the first pipe of the first leader and the second pipe of the first manifold, the outer pipe of the double-skinned pipe being positioned outside the housing and having a collar pressed against the housing and sealably connected thereto around an orifice of the housing through which the inner pipe of the double-skinned pipe or the one of the first pipe of the first leader and the second pipe of the first manifold passes.

According to another feature, at least one of the third pipe of the second leader and the fourth pipe of the second manifold has a collar positioned inside the housing, pressed against and sealably connected thereto around an orifice passing through the housing.

According to another feature, the heat exchanger comprises a matrix made from an impermeable material in which the body is embedded.

According to another feature, the first and second assemblies are pressed directly against each other.

According to another feature, at least two first and second assemblies are spaced apart from each other. In addition, the body comprises at least one layer of thermally conductive material interposed between the spaced apart first and second assemblies, transferring heat between them.

According to another feature, the housing contains an inerted atmosphere.

According to another feature, the housing is evacuated.

According to another feature, the housing comprises at least one sensor configured to detect the presence of oxygen in the housing.

The invention also relates to an aircraft comprising at least one heat exchanger according to one of the preceding features.

BRIEF DESCRIPTION OF THE DRAWINGS

Further features and advantages will become apparent on reading the following description of the invention, given by way of example only, with reference to the attached drawings, in which.

DETAILED DESCRIPTION OF THE PREFERRED EMBODIMENTS

Figure 1:
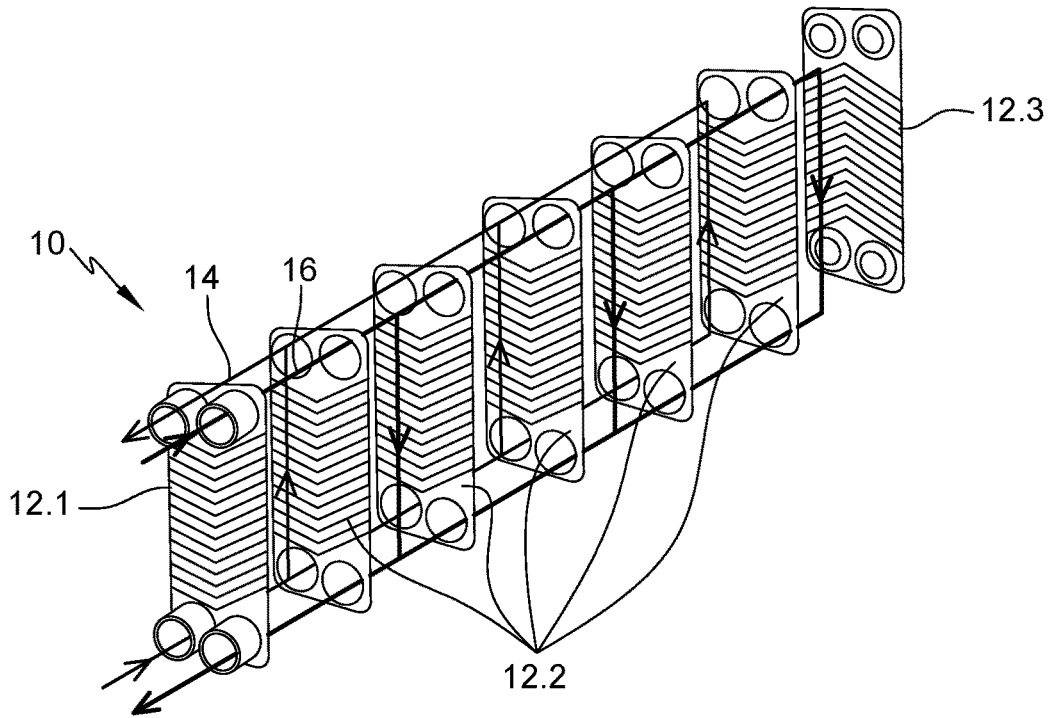
FIG. 1 is an exploded perspective view of a heat exchanger, illustrating an embodiment of the prior art.
Figure 2:
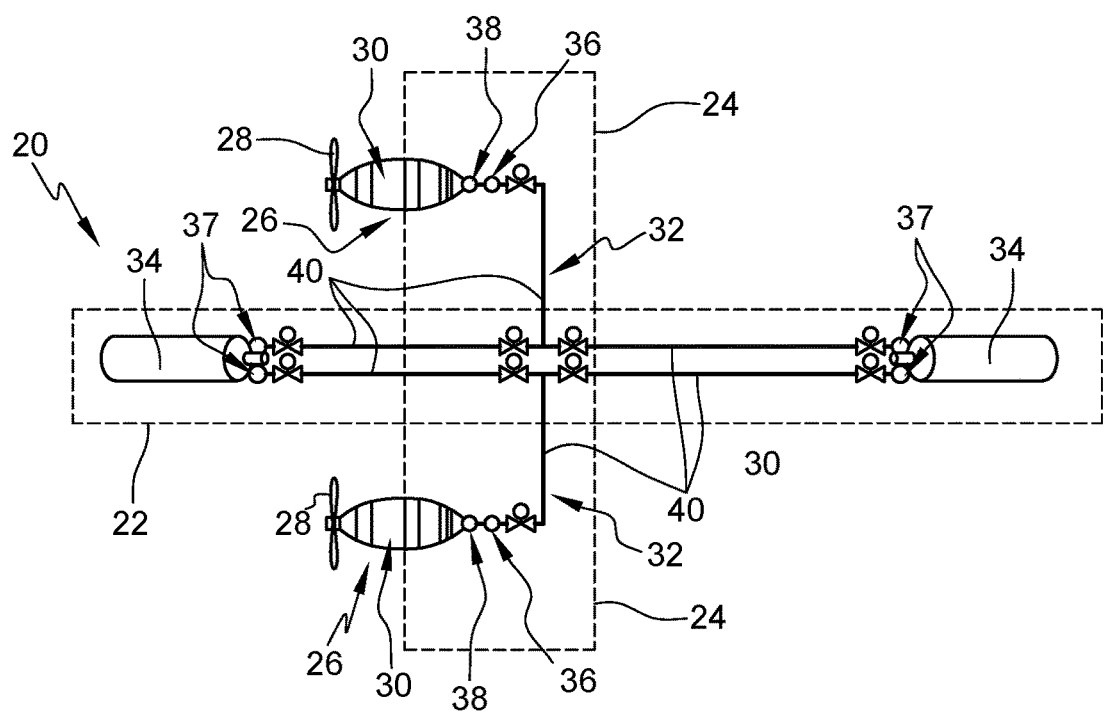
FIG. 2 is a schematic depiction of an aircraft comprising hydrogen-powered engines.

In FIG. 2, an aircraft 20 comprises a fuselage 22, wings 24 that extend on either side of the fuselage 22, and powerplants 26 connected to the wings 24. Each powerplant 26 comprises a propeller 28 and a hydrogen engine 30 rotating the propeller 28.

For each powerplant 26, the aircraft 20 comprises a hydrogen supply device 32 having at least one hydrogen tank 34, for example positioned in the fuselage 22, a pump 36 for pressurizing the hydrogen, a heat exchanger 38 configured to heat the hydrogen, and hydrogen pipes 40 for conveying the hydrogen from the hydrogen tank 34 to the hydrogen engine 30, passing through the pump 36 and the heat exchanger 38. The hydrogen tank 34 can be common to a plurality of powerplants 26.

According to a configuration shown in FIG. 2, the heat exchanger 38 is positioned near the hydrogen engine 30 and is configured to heat the hydrogen so that the hydrogen passes from a liquid state to a gaseous state. According to this configuration, the hydrogen is distributed from the hydrogen tank 34 to the hydrogen engine 30 with the hydrogen in a liquid state.

The pump 36 is a high-pressure pump.

According to one configuration, not shown, the pump 36 is positioned at the outlet of the hydrogen tank 34 and the hydrogen pipes 40 are double-skinned tubes or pipes.

According to another configuration, shown in FIG. 2, the pump 36 is positioned near the heat exchanger 38, that is, as close as possible to the hydrogen engine 30. The hydrogen pipes 40 are double-skinned tubes or pipes. An additional pump 37 can be arranged at the outlet of the hydrogen tank 34, in order to convey the hydrogen to the pump 36.

According to one embodiment, shown in FIGS. 3, 4, 10 to 13, a heat exchanger 38 is a plate heat exchanger comprising a sealed housing 42 and a body 44 positioned inside the housing 42 and configured to transfer heat between first and second fluids 46, 48.

According to one application, the first fluid 46 is hydrogen and the second fluid 48 is a heat transfer fluid configured to heat the hydrogen.

According to one embodiment, the housing 42 is rigid and defines a cavity in which the body 44 of the heat exchanger 38 is positioned. The housing 42 contains an oxygen-free inerted atmosphere, such as an inert gas for example, in order to avoid any fire ignition or detonation. The housing 42 can also be evacuated.

Figure 3:
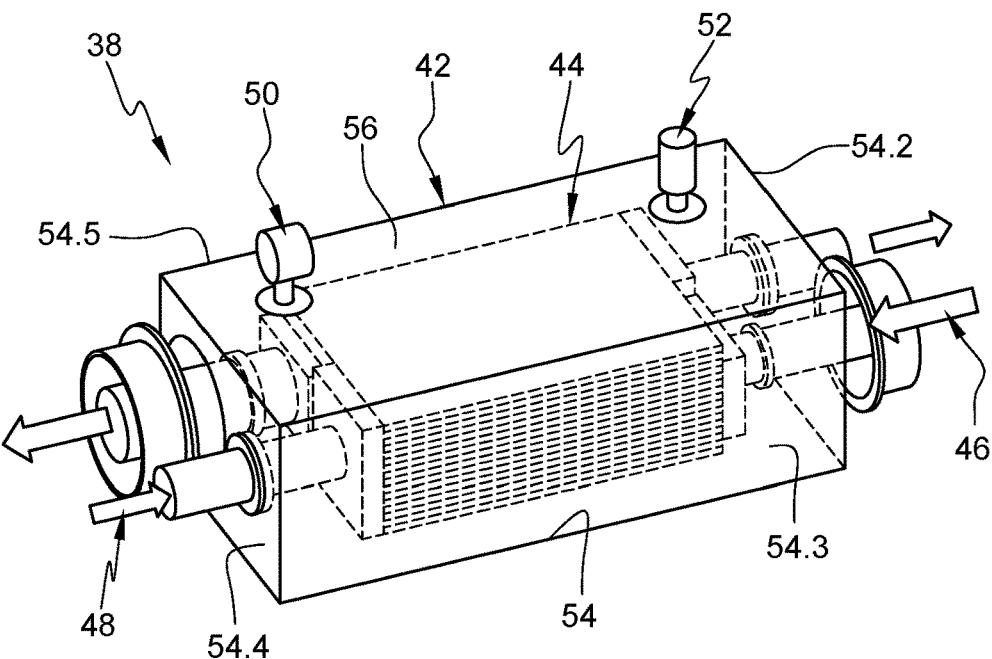
FIG. 3 is a perspective view of a heat exchanger, illustrating an embodiment of the invention.
Figure 4:
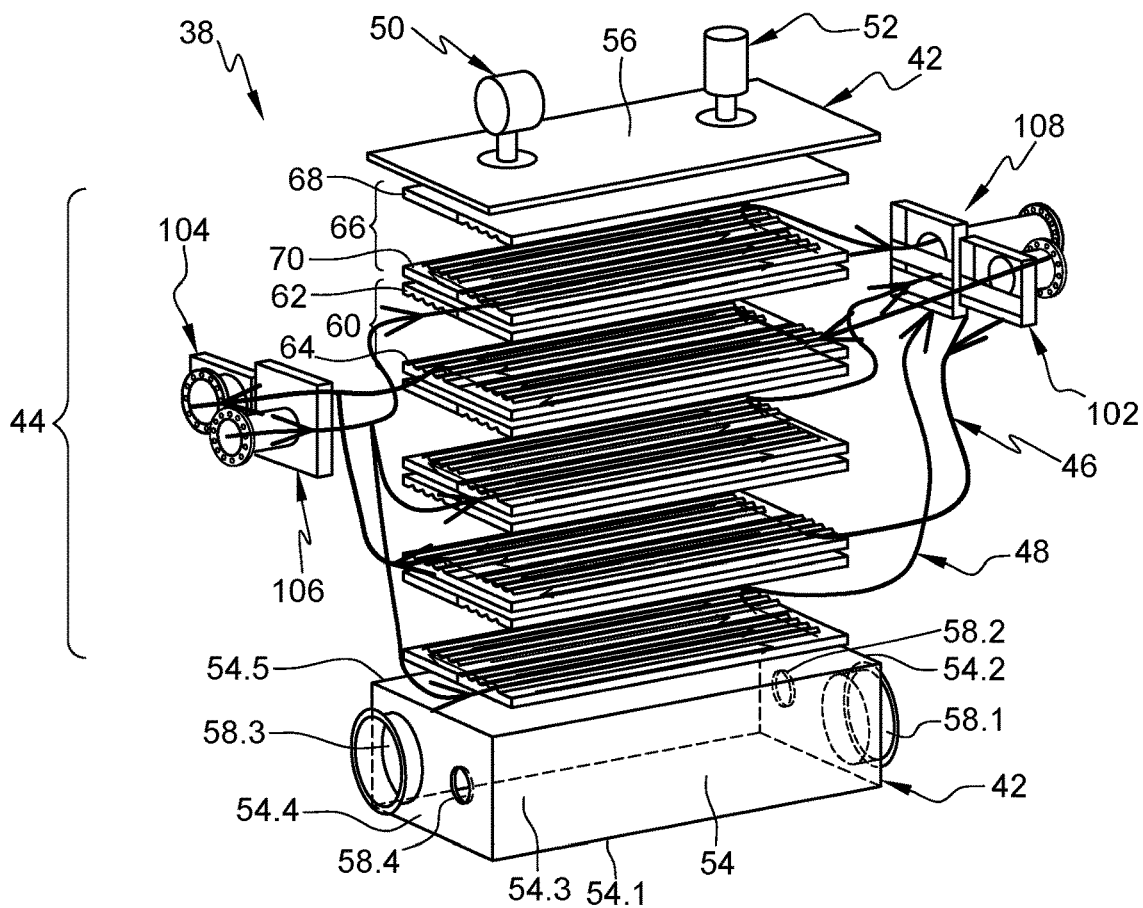
FIG. 4 is an exploded perspective view of the heat exchanger shown in FIG. 3.
Figure 7:
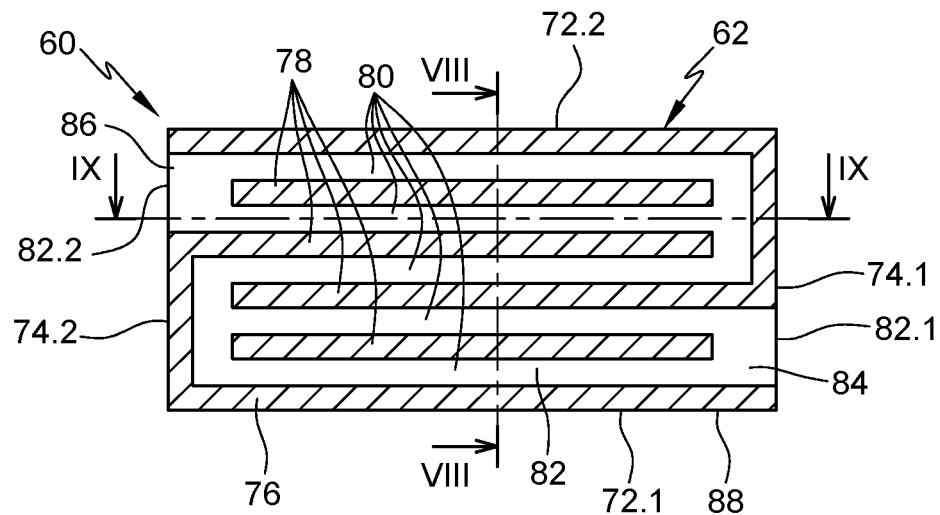
FIG. 7 is a cross-section along the plane VII in FIG. 5 of a first assembly of first and second plates of a heat exchanger, illustrating an embodiment of the invention.
Figure 8:
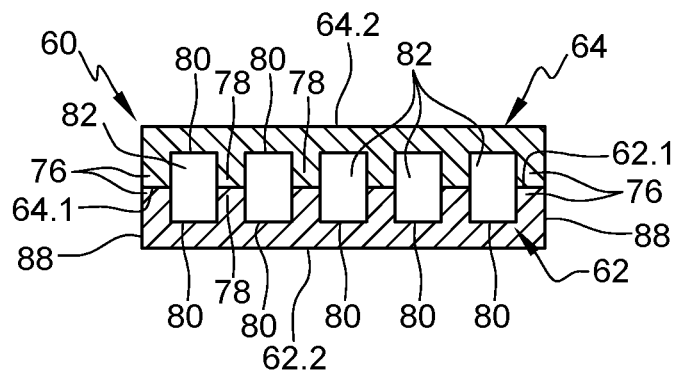
FIG. 8 is a cross-section along the line VIII-VIII in FIG. 7.
Figure 9:
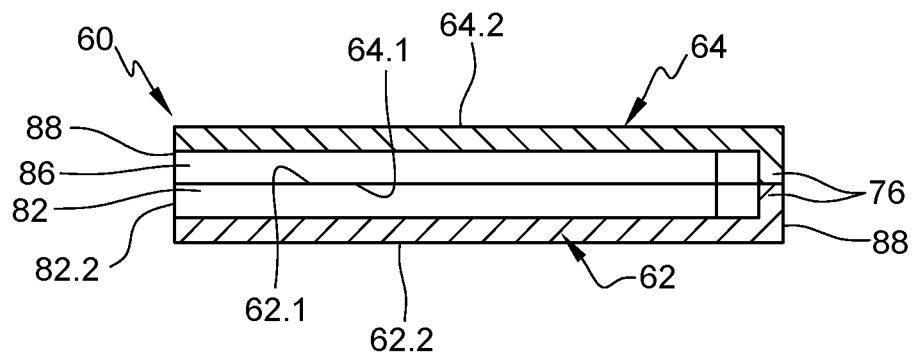
FIG. 9 is a cross-section along the line IX-IX in FIG. 7.

According to one configuration, shown in FIGS. 3, 4 and 7, the housing 42 comprises at least one tapping point 52 to make it possible to extract the oxygen initially present in the housing 42 and to inject an inert gas into it. The tapping point 52 can also be used to evacuate the housing 42. The housing 42 also comprises at least one sensor 50 configured to detect the presence of hydrogen in the housing 42. According to one configuration, the housing 42 also comprises at least one sensor configured to detect the presence of oxygen in the housing 42. According to one configuration, the housing 42 also comprises at least one sensor 50 configured to detect the presence of oxygen and the presence of hydrogen in the housing 42.

According to one embodiment, the housing 42 is approximately parallelepipedal and comprises a container 54 having a base 54.1 and four side walls 54.2 to 54.5, together with a cover 56 sealably connected to the side walls 54.2 to 54.5 by means of a peripheral seal and connecting elements, for example.

The housing 42 can be metal or made from a composite material.

As illustrated in FIG. 4, the housing 42 comprises four orifices 58.1 to 58.4 passing through at least one side wall 54.2, 54.4, more particularly two opposite walls 54.2, 54.4.

Of course, the invention is not limited to this form or this design of the housing 42.

The body 44 of the heat exchanger 38 comprises at least one first assembly 60 of first and second plates 62, 64 pressed against each other, between which flows the first fluid 46, and at least one second assembly 66 of third and fourth plates 68, 70 pressed against each other, between which flows the second fluid 48, the first and second assemblies 60, 66 being arranged so that they transfer heat between the first and second fluids 46, 48. The first and second plates 62, 64 of a first assembly 60 are distinct from the third and fourth plates 68, 70 of a second assembly 66.

According to one configuration, shown in FIGS. 3 to 6, the body 44 comprises a plurality of first assemblies 60 and a plurality of second assemblies 66 positioned alternately. Two first assemblies 60 are thus separated by a second assembly 66 and two second assemblies 66 are separated by a first assembly 60.

The plates 62, 64, 68, 70 are made from a thermally conductive material.

In geometric terms, the plates 62, 64, 68, 70 have identical perimeters. According to one configuration, all of the plates 62, 64, 68, 70 are rectangular and each one has first and second long sides 72.1, 72.2 parallel to each other and first and second short sides 74.1, 74.2 parallel to each other.

Figure 5:
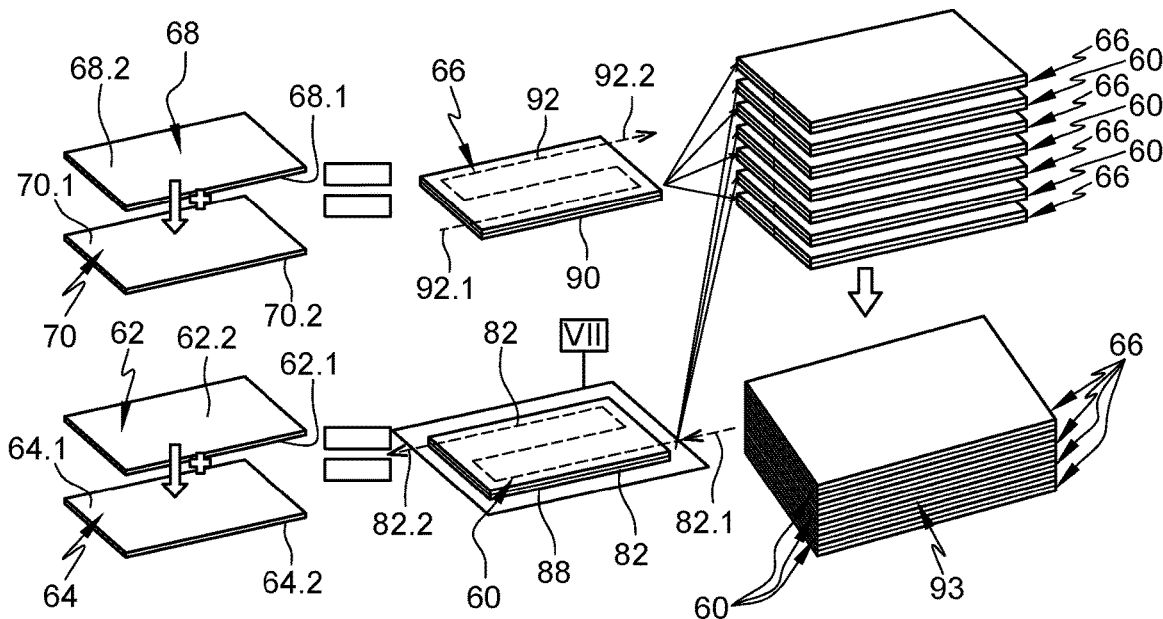
FIG. 5 is a schematic depiction of a method for assembling plates of a heat exchanger, illustrating an embodiment of the invention.

As illustrated in FIG. 5, in each first assembly 60, the first plate 62 comprises an inner face 62.1 oriented towards the second plate 64 and an outer face 62.2 on the opposite side to the inner face 62.1. In parallel, the second plate 64 comprises an inner face 64.1 oriented towards the first plate 62 and an outer face 64.2 on the opposite side to the inner face 64.1. As illustrated in FIG. 7, at least one of the first and second plates 62, 64 comprises, on its inner face 62.1, a peripheral lip 76 extending over almost the entire periphery of the first or second plate 62, 64, and at least one rib 78 defining at least one groove 80 with the peripheral lip 76.

According to one configuration, only the first plate 62 comprises a peripheral lip 76 and at least one rib 78. When the inner faces 62.1, 64.1 of the first and second plates 62, 64 are pressed against each other, the peripheral lip 76 and the rib(s) 78 are thus in contact with the second plate 64 and the groove(s) 80 form(s) at least one first channel 82 configured to channel the first fluid 46.

According to another configuration, each first or second plate 62, 64 comprises a peripheral lip 76 and at least one rib 78, arranged so that when the inner faces 62.1, 64.1 of the first and second plates 62. 64 are pressed against each other, the peripheral lip 76 and the rib(s) 78 of the first plate 62 are in contact with the peripheral lip and the rib(s) of the second plate 64 and define at least one first channel 82 configured to channel the first fluid 46.

On at least one plate of the first and second plates 62, 64, the peripheral lip 76 comprises at least one first cut-out 84 and at least one second cut-out 86, away from the first cut-out 84, configured to connect the channel 82 to the outside of the first assembly 60.

The first and second cut-outs 84, 86 are positioned on opposite sides of the first or second plate 62, 64. They are offset from each other in the direction of the width of the first or second plate 62, 64. According to one configuration, the first cut-out 84 is positioned on the first short side 74.1, on the half of the first short side 74.1 close to the first long side 72.1, and the second cut-out 86 is positioned on the second short side 74.2, on the half of the second short side 74.2 close to the second long side 72.2.

Regardless of the embodiment, each first assembly 60 comprises first and second plates 62, 64 pressed against each other and sealably connected, at least one first peripheral rim 88 around the first and second plates 62, 64 (formed by the peripheral lips 76 of the first and second plates 62, 64), and at least one first channel 82 configured to channel the first fluid 46, positioned between the first and second plates 62, 64 and having a first end 82.1 emerging on the first peripheral rim 88, corresponding to the first cut-out 84, and a second end 82.2 emerging on the first peripheral rim 88, corresponding to the second cut-out 86.

According to one arrangement, the first fluid 46 flows in the first channel 82 from the first end 82.1 to the second end 82.2.

According to one embodiment, the outer faces 62.2, 64.2 of the first and second plates 62, 64 are flat and smooth.

In each second assembly 66, the third plate 68 comprises an inner face 68.1 oriented towards the fourth plate 70 and an outer face 68.2 on the opposite side to the inner face 68.1. In parallel, the fourth plate 70 comprises an inner face 70.1 oriented towards the third plate 68 and an outer face 70.2 on the opposite side to the inner face 70.1. At least one of the third and fourth plates 68, 70 comprises, on its inner face, a peripheral lip extending over almost the entire periphery of the third or fourth plate, and at least one rib defining, with the peripheral lip, at least one groove that forms, when the third and fourth plates 68, 70 are assembled, a second channel 92 configured to channel the second fluid 48.

Regardless of the embodiment, each second assembly 66 comprises third and fourth plates 68, 70 pressed against each other and sealably connected, at least one second peripheral rim 90 around the third and fourth plates 68, 70 (formed by the peripheral lips of the third and fourth plates 68, 70), and at least one second channel 92 configured to channel the second fluid 48, positioned between the third and fourth plates 68, 70 and having a first end 92.1 emerging on the second peripheral rim 90 and a second end 92.2 emerging on the second peripheral rim 90.

According to one arrangement, the second fluid 48 flows in the second channel 92 from the first end 92.1 to the second end 92.2.

According to one embodiment, the outer faces 68.2, 70.2 of the third and fourth plates 68, 70 are flat and smooth.

As illustrated in FIG. 5, the first and second plates 62, 64 are assembled two by two so as to obtain first assemblies 60. In each first assembly 60, the first and second plates 62, 64 are sealably connected, excluding the first channel 82. In parallel, the third and fourth plates 68, 70 are assembled two by two so as to obtain second assemblies 66. In each second assembly 66, the third and fourth plates 68, 70 are sealably connected, excluding the second channel 92.

Next, the first and second assemblies 60, 66 are stacked on top of each other alternately in order to obtain a stack 93 of first and second assemblies 60, 66.

Figure 10:
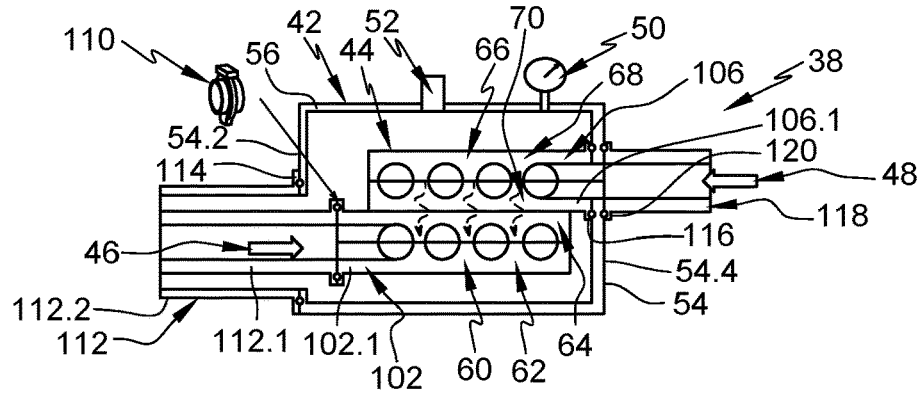
FIG. 10 is a schematic cross-section of a heat exchanger, illustrating a first embodiment of the invention.
Figure 11:
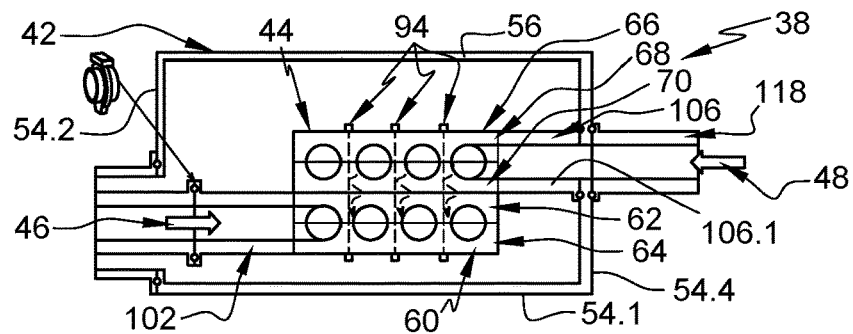
FIG. 11 is a schematic cross-section of a heat exchanger, illustrating a second embodiment of the invention.

According to first and second embodiments, shown in FIGS. 10 and 11 respectively, the first and second assemblies 60, 66 are pressed directly against each other. According to the first embodiment, the first and second assemblies 60, 66 are kept pressed against each other by adhesive bonding or welding. According to the second embodiment, the first and second assemblies 60, 66 are kept pressed against each other by means of connecting elements 94 passing through the stack 93 of first and second assemblies 60, 66.

Figure 12:
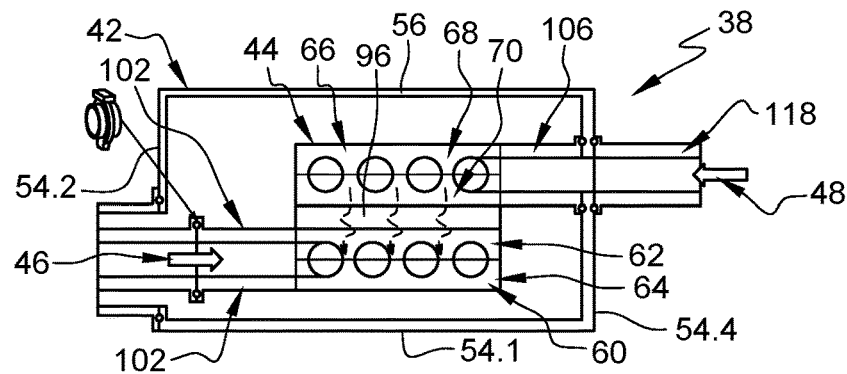
FIG. 12 is a schematic cross-section of a heat exchanger, illustrating a third embodiment of the invention.

According to a third embodiment, shown in FIG. 12, the body 44 comprises at least two first and second assemblies 60, 66 spaced apart from each other, and at least one layer of thermally conductive material 96 interposed between the spaced apart first and second assemblies 60, 66. According to one configuration, all of the first and second assemblies 60, 66 are spaced apart from each other, layers of thermally conductive material 96 being interposed between the first and second assemblies 60, 66.

Figure 13:
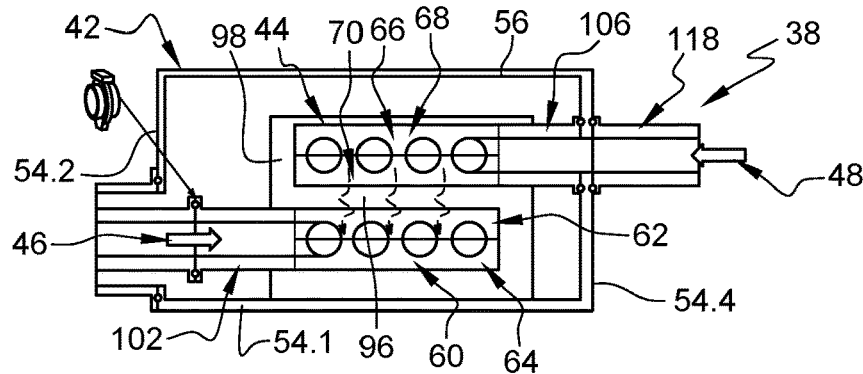
FIG. 13 is a schematic cross-section of a heat exchanger, illustrating a fourth embodiment of the invention.

According to a fourth embodiment, shown in FIG. 13, the heat exchanger 38 comprises a matrix 98 made from a material impermeable to the first and second fluids 46, 48, in which the body 44 is embedded. According to a configuration not shown, the first and second assemblies 60, 66 are pressed directly against each other. According to another configuration, shown in FIG. 13, at least two first and second assemblies 60, 66 are spaced apart from each other. According to the other configuration, the matrix 98 is made from an impermeable, thermally conductive material and forms layers of thermally conductive material 96 between the first and second assemblies 60, 66, transferring heat between the first and second assemblies 60, 66.

According to the third and fourth embodiments, the layers of thermally conductive material 96 also ensure cohesion between the first and second assemblies 60, 66.

By way of example, the thermally conductive material is a metal foam.

According to one embodiment, the stack 93 of first and second assemblies 60, 66 has substantially flat, parallel opposite first and second faces 100.1, 100.2, on which the first and second ends 82.1, 82.2, 92.1, 92.2 of the first and second channels 82, 92 are distributed. The first ends 82.1 of the first channels 82 and the second ends 92.2 of the second channels 92 are positioned on the first face 100.1. The second ends 82.2 of the first channels 82 and the first ends 92.1 of the second channels 92 are positioned on the second face 100.2.

According to one configuration, the first ends 82.1 of the first channels 82 are offset from the second ends 92.2 of the second channels 92. The first ends 82.1 of the first channels 82 are thus positioned on a first half of the first face 100.1 and the second ends 92.2 of the second channels 92 are positioned on a second half of the first face 100.1.

The second ends 82.2 of the first channels 82 are offset from the first ends 92.1 of the second channels 92. The second ends 82.2 of the first channels 82 are thus positioned on a first half of the second face 100.2 and the first ends 92.1 of the second channels 92 are positioned on a second half of the second face 100.2.

Figure 6:
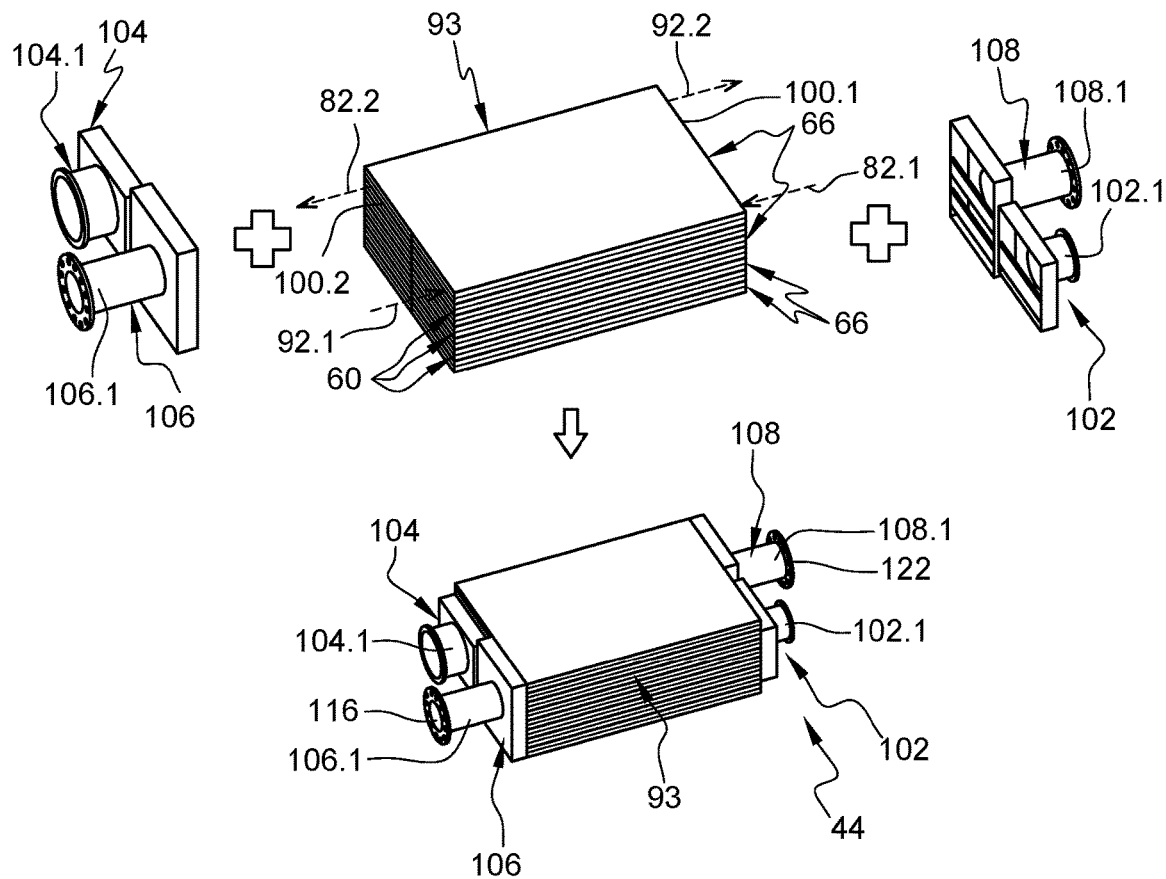
FIG. 6 is a schematic depiction of a method for manufacturing a body of a heat exchanger, illustrating an embodiment of the invention.

According to one embodiment, shown, in particular, in FIG. 6, the body 44 comprises:
  a first leader 102 having a first pipe 102.1 and configured to connect the first pipe 102.1 to the first ends 82.1 of the first channels 82 of the first assemblies 60,
  a first manifold 104 having a second pipe 104.1 and configured to connect the second pipe 104.1 to the second ends 82.2 of the first channels 82 of the first assemblies 60,
  a second leader 106 having a third pipe 106.1 and configured to connect the third pipe 106.1 to the first ends 92.1 of the second channels 92 of the second assemblies 66,
  a second manifold 108 having a fourth pipe 108.1 and configured to connect the fourth pipe 108.1 to the second ends 92.2 of the second channels 92 of the second assemblies 66.

The first leader 102 and the second manifold 108 are thus positioned against the first face 100.1 and sealably connected thereto. The first manifold 104 and the second leader 106 are positioned against the second face 100.2 and sealably connected thereto.

According to one embodiment, shown in FIG. 10, the first pipe 102.1 is connected by a connection system 110 to an inner pipe 112.1 of a first double-skinned pipe 112, the first pipe 102.1 or the inner pipe 112.1 passing through the first orifice 58.1 of the housing 42. The outer pipe 112.2 of the first double-skinned pipe 112 is positioned outside the housing 42 and has a collar 114 pressed against the housing 42 and sealably connected thereto around the first orifice 58.1 by means of a ring seal and connecting elements. The space between the inner and outer pipes 112.1, 112.2 of the first double-skinned pipe 112 thus communicates with the inside of the housing 42 and contains an inert gas.

According to one embodiment, the second pipe 104.1 is connected by a connection system to an inner pipe of a second double-skinned pipe. The outer pipe of the second double-skinned pipe is positioned outside the housing 42 and has a collar pressed against the housing 42 and sealably connected thereto around the third orifice 58.3 by means of a ring seal and connecting elements. The space between the inner and outer pipes of the second double-skinned pipe thus communicates with the inside of the housing 42 and contains an inert gas.

According to one embodiment, the third pipe 106.1 has a collar 116 positioned inside the housing 42, pressed against and sealably connected thereto around the fourth orifice 58.4 by means of a ring seal and connecting elements. Outside the housing 42, the third pipe 106.1 is extended by a single-skinned pipe 118 having a collar 120 positioned outside the housing 42, pressed against and sealably connected thereto around the fourth orifice 58.4 by means of a ring seal and connecting elements.

According to one embodiment, the fourth pipe 108.1 has a collar 122 positioned inside the housing 42, pressed against and sealably connected thereto around the second orifice 58.2 by means of a ring seal and connecting elements. Outside the housing 42, the fourth pipe 108.1 is extended by a single-skinned pipe having a collar positioned outside the housing 42, pressed against and sealably connected thereto around the second orifice 58.2 by means of a ring seal and connecting elements.

According to the invention, the first and second fluids 46, 48 are separated by two plates, which makes it possible to reduce the risk of the first and second fluids mixing. As a result, if the first fluid is hydrogen, the pipes channeling the second fluid can be single-skinned pipes.

According to another advantage, as the body 44 of the heat exchanger 38 is positioned inside a sealed housing 42, the risk of hydrogen leaks outside the housing 42 are infinitesimal. Embedding the first and second assemblies 60, 66 in a matrix of a material also makes it possible to reduce the risk of leaks.

The presence of an inert gas in the housing 42 around the body 44 of the heat exchanger 38 reduces the risk of fire ignition or detonation.

Likewise, the evacuation of the housing 42 around the body 44 of the heat exchanger 38 reduces the risk of fire ignition or detonation.

Finally, providing the housing with a sensor 50 for detecting the presence of hydrogen in the housing 42 makes it possible to detect a hydrogen leak before it propagates outside the housing 42.

According to one configuration, only the first and second fluids 46, 48 flow in the heat exchanger 38. In other words, no fluid flows between one of the plates 62, 64 of the first assembly 60 and one of the plates 68, 70 of the second assembly 66.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A plate heat exchanger transferring heat between first and second fluids, comprising:
   a sealed housing, and
   a body positioned inside the housing, said body including a stack of at least a first assembly of first and second plates pressed against each other, between which the first fluid flows, and at least a second assembly of third and fourth plates pressed against each other, between which the second fluid flows, the first and second assemblies being arranged so that they transfer heat between the first and second fluids,
   wherein the first fluid is hydrogen and the housing comprises at least one sensor configured to detect a presence of hydrogen in the housing,
   wherein the housing defines a cavity in which the body is positioned, the housing comprises an atmosphere, and the atmosphere is an inert atmosphere or a vacuum,
   wherein the second fluid is a heat transfer fluid, and
   wherein the housing has a first pair of orifices through which the first fluid flows to and from the first assembly, a second pair of orifices through which the second fluid flows to and from the second assembly, and a tapping point through which at least one of oxygen is extracted from the cavity or an inert gas is introduced into the cavity.

2. The heat exchanger as claimed in claim 1,
   wherein each first assembly comprises at least one first peripheral rim around the first and second plates, and at least one first channel configured to channel the first fluid, positioned between the first and second plates and having a first end emerging on the first peripheral rim and a second end emerging on the first peripheral rim, and
   wherein each second assembly comprises at least one second peripheral rim around the third and fourth plates, and at least one second channel configured to channel the second fluid, positioned between the third and fourth plates and having a first end emerging on the second peripheral rim and a second end emerging on the second peripheral rim.

3. The heat exchanger as claimed in claim 2, wherein the body comprises a stack of a plurality of first assemblies and a plurality of second assemblies, the first and second assemblies being alternated, said stack including first and second faces on which the first and second ends of the first and second channels are distributed.

4. The heat exchanger as claimed in claim 3, wherein the first ends of the first channels of the first assemblies are positioned on a first half of the first face and the second ends of the second channels of the second assemblies are positioned on a second half of the first face, and the second ends of the first channels of the first assemblies are positioned on a first half of the second face and the first ends of the second channels of the second assemblies are positioned on a second half of the second face.

5. The heat exchanger as claimed in claim 4, wherein the body comprises:
   a first leader having a first pipe and configured to connect said first pipe to the first ends of the first channels of the first assemblies,
   a first manifold having a second pipe and configured to connect said second pipe to the second ends of the first channels of the first assemblies,
   a second leader having a third pipe and configured to connect said third pipe to the first ends of the second channels of the second assemblies,
   a second manifold having a fourth pipe and configured to connect said fourth pipe to the second ends of the second channels of the second assemblies.

6. The heat exchanger as claimed in claim 5, wherein the heat exchanger comprises at least one double-skinned pipe including inner and outer pipes, and a connection system connecting the inner pipe of the double-skinned pipe and one of the first pipe of the first leader and the second pipe of the first manifold, the outer pipe of the double-skinned pipe being positioned outside the housing and having a collar pressed against the housing and sealably connected thereto around an orifice of the housing through which the inner pipe of the double-skinned pipe or the one of the first pipe of the first leader and the second pipe of the first manifold passes.

7. The heat exchanger as claimed in claim 5, wherein at least one of the third pipe of the second leader and the fourth pipe of the second manifold has a collar positioned inside the housing, pressed against and sealably connected thereto around an orifice passing through the housing.

8. The heat exchanger as claimed in claim 1, wherein the heat exchanger comprises a matrix made from an impermeable material in which the body is embedded.

9. The heat exchanger as claimed in claim 1, wherein the first and second assemblies are pressed directly against each other.

10. The heat exchanger as claimed in claim 1, wherein at least two first and second assemblies are spaced apart from each other and the body comprises at least one layer of thermally conductive material, interposed between the spaced apart first and second assemblies, transferring heat between them.

11. The heat exchanger as claimed in claim 1, wherein the housing comprises at least one sensor configured to detect a presence of oxygen in the housing.

12. An aircraft comprising at least one heat exchanger as claimed in claim 1.

* * * * *